United States Patent
Reineke et al.

(10) Patent No.: US 12,518,014 B2
(45) Date of Patent: Jan. 6, 2026

(54) DATA CONFIDENCE AND SOFTWARE DEVELOPMENT OPERATIONS

(71) Applicant: Dell Products L.P., Round Rock, TX (US)

(72) Inventors: Nicole Reineke, Northborough, MA (US); Stephen J. Todd, North Andover, MA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 693 days.

(21) Appl. No.: 17/652,218

(22) Filed: Feb. 23, 2022

(65) Prior Publication Data

US 2023/0267210 A1    Aug. 24, 2023

(51) Int. Cl.
*G06F 21/57* (2013.01)
*G06F 8/41* (2018.01)

(52) U.S. Cl.
CPC ............ *G06F 21/57* (2013.01); *G06F 8/4452* (2013.01); *G06F 8/447* (2013.01); *G06F 2221/033* (2013.01); *G06F 2221/2101* (2013.01)

(58) Field of Classification Search
CPC ........ G06F 21/57; G06F 8/4452; G06F 8/447; G06F 2221/033; G06F 2221/2101; G06F 8/60; G06F 8/41; G06F 8/70; G06F 21/577; G06F 8/71
See application file for complete search history.

(56) References Cited

U.S. PATENT DOCUMENTS

| | | | |
|---|---|---|---|
| 11,099,835 B1* | 8/2021 | Wall | G06F 8/61 |
| 11,513,772 B1* | 11/2022 | Gross | H04L 67/10 |
| 2009/0196485 A1 | 8/2009 | Mueller et al. | |
| 2016/0147875 A1* | 5/2016 | Adderly | G06F 40/30 |
| | | | 707/726 |
| 2017/0003948 A1* | 1/2017 | Iyer | H04L 41/5054 |
| 2018/0075194 A1* | 3/2018 | Allen | G16H 70/20 |
| 2019/0103092 A1 | 4/2019 | Rusak et al. | |
| 2019/0228262 A1 | 7/2019 | Gonzalez et al. | |
| 2019/0265714 A1* | 8/2019 | Ball | G06N 3/08 |
| 2019/0303579 A1* | 10/2019 | Reddy | H04L 9/3239 |
| 2020/0218623 A1* | 7/2020 | Zhang | G06F 8/60 |
| 2020/0287919 A1* | 9/2020 | Ravindranath | H04L 41/16 |
| 2021/0014127 A1 | 1/2021 | Iyengar et al. | |
| 2021/0303296 A1* | 9/2021 | Ahuja | G06F 8/60 |
| 2022/0043711 A1 | 2/2022 | Shemer et al. | |
| 2022/0043721 A1 | 2/2022 | Shemer et al. | |
| 2022/0100858 A1* | 3/2022 | Todd | G06F 21/57 |

(Continued)

OTHER PUBLICATIONS

Lawton, The future of trust will be built on data transparency, pp. 1-10, Mar. 2021.

(Continued)

*Primary Examiner* — Taghi T Arani
*Assistant Examiner* — Blake I Narramore
(74) *Attorney, Agent, or Firm* — Workman Nydegger

(57) ABSTRACT

A data confidence fabric for generating data confidence scores for a build pipeline is disclosed. Confidence scores are generated for data or jobs in a build pipeline. The scores may be combined into a final confidence score that reflects a confidence in the artifact generated by the pipeline and in the pipeline. A user or infrastructure may or may not perform the artifact based on the associated confidence score.

20 Claims, 7 Drawing Sheets

(56) References Cited

U.S. PATENT DOCUMENTS

2022/0291921 A1* 9/2022 Balasubramanian ..... G06F 8/10
2022/0335154 A1   10/2022 Schuler et al.
2022/0398308 A1* 12/2022 Zerah ...................... G06F 21/52
2023/0061701 A1   3/2023 Shih et al.

OTHER PUBLICATIONS

Perez, Alvarium, pp. 1-2 (Year: 2021).
Todd, Building the First Data Confidence Fabric, pp. 1-9 Oct. 2019.
Todd, Enterprise Trust Insertion and IoT, pp. 1-2, Aug. 5, 2019.
Todd, Information Playground: Edge Data and Trust Insertion, pp. 1-3, Sep. 18, 2019.
Todd, Information Playground: IoT Data Confidence Fabrics, pp. 1-3, May 30, 2019.
Todd, Project Alvarium: the Future of Edge Data, pp. 1-39 (Year: 2020).

* cited by examiner

DATA CONFIDENCE AND SOFTWARE DEVELOPMENT OPERATIONS

FIELD OF THE INVENTION

Embodiments of the present invention generally relate to data confidence fabrics and to generating data confidence scores. More particularly, at least some embodiments of the invention relate to systems, hardware, software, computer-readable media, and methods for generating data confidence scores for software development operations including development pipelines.

BACKGROUND

Software development and deployment can be performed in a variety of ways. Pipelines such as continuous integration and continuous delivery (CI/CD) are used to develop and deploy software, as suggested by the name, in a continuous manner. Pipelines allow changes to an application to be implemented more quickly (e.g., continuously) compared to conventional software development scenarios.

Unfortunately, malicious entities are attacking applications during application development in addition to after deployment. If a malicious entity can compromise the build and deployment processes, applications which were previously believed to be authentic and uncorrupted are now compromised.

Installing new software and applying updates to existing installations is more dangerous at least because customers may be unaware of malware embedded in what is believed to be legitimate software or software updates but are actually compromised prior to deployment. Most customers, when applying an update or performing an initial install that is believed to be legitimate, simply say yes to any questions that arise during installation with little worry. Because the update or install may have been compromised prior to deployment, customers now face more risk.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data confidence fabrics and data confidence scores generated by data confidence fabrics. More particularly, at least some embodiments of the invention relate to systems, hardware, software, computer-readable media, and methods for generating data confidence scores for development operations (DevOps), pipelines, pipeline operations, source code (or code portion), compiled code, artifacts, images, and the like.

DevOps generally relates to the process by which an entity develops and delivers applications or services. This is often achieved using a pipeline, which may perform processing of different types. A pipeline may include stages and the output of each stage often serves as the input to the next stage. Each stage may include multiple processes or functions.

Pipelines may be described as providing continuous integration, continuous delivery, and/or continuous deployment. A pipeline can be implemented in many different manners. By way of example only, a pipeline may include both jobs and stages. Jobs may include processes or operations such as compiling code, testing code, deploying code, load balancing, or the like. Stages define or relate where a job is performed and/or when a job is performed relative to other jobs.

Embodiments of the invention relate to generating confidence scores for pipelines, pipeline jobs, pipeline stages, images, artifacts, or the like. Embodiments of the invention may also relate to generating confidence scores for deployment mechanisms or IaaS (Infrastructure as a Service), such as a Kubernetes deployment mechanism, in addition to confidence scores for pipelines.

An application generally starts out as source code that has been written by a developer or developers. The source code is generally compiled into an executable of some form. The executable may be tested, packaged, and ultimately delivered to an operating environment. These processes may be subject to attack at various points and embodiments of the invention allow confidence scores to be generated that reflect confidence in the security of the pipeline or any application generated thereby.

Figure 1:
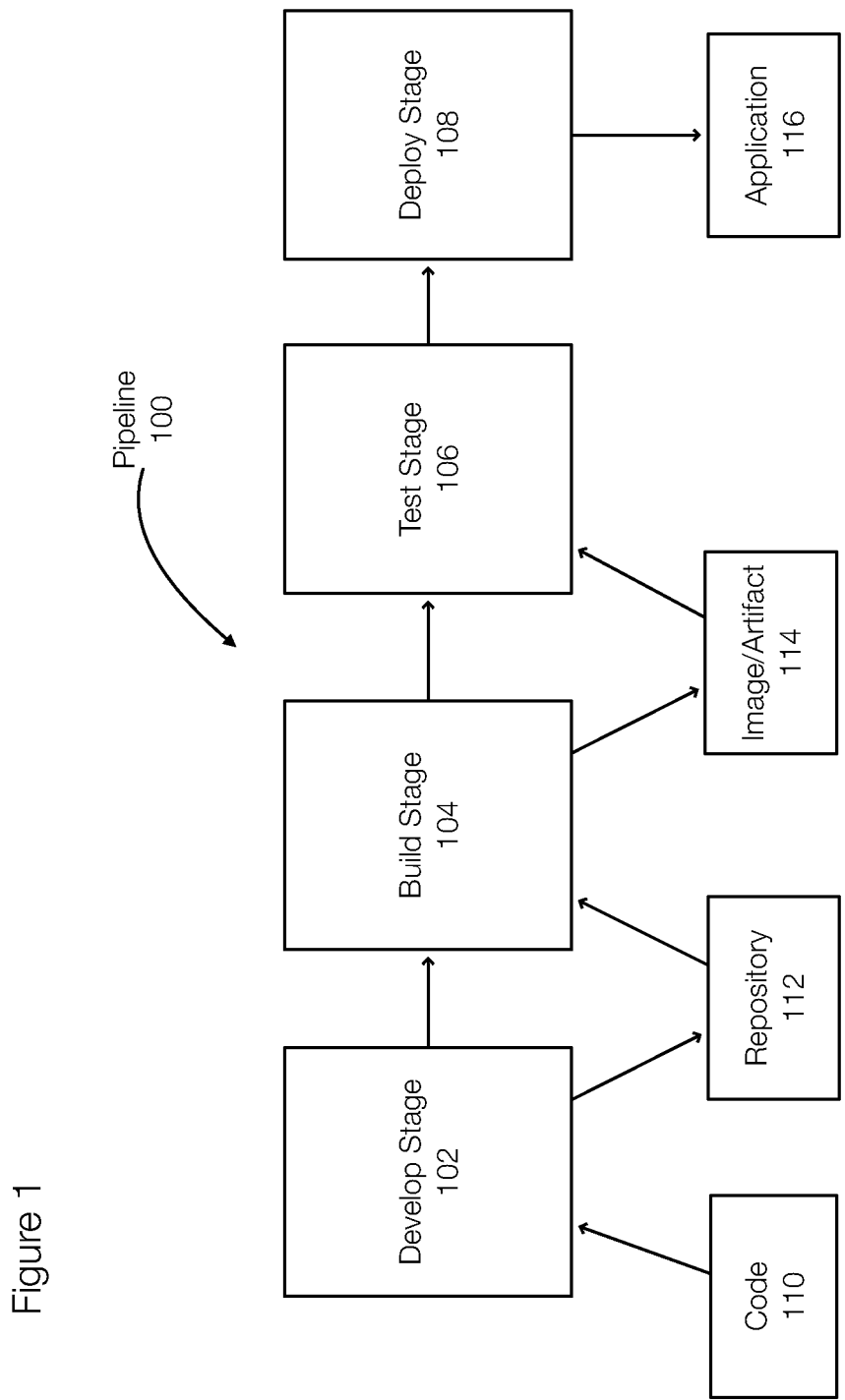
FIG. 1 discloses aspects of an example build pipeline.

FIG. 1 discloses aspects of a pipeline. Example pipelines include Jenkins pipelines, Gitlab pipelines, or the like. The pipeline 100 is intended as a generic representation of a pipeline at least because pipelines can vary according to type, provider, operating system, programming language, operating environment, or the like. The pipeline 100 is intended to generally represent jobs and stages of a pipeline and represents multiple different types of pipelines.

The pipeline 100 is an example of implementing operations or processes in the context of developing and deploying applications (e.g., executables, container images, binaries). The pipeline 100, by way of example, includes a develop stage 102, a build stage 104, a test stage 106, and a deploy stage 108. One or more processes or operations may be performed at each of the stages 102, 104, 106, and 108.

The following discussion provides examples of pipeline operations and embodiments of the invention are not limited thereto. With regard to the develop stage 102, code 110 prepared by a user may be deposited into a repository 112. The develop stage 102 may receive code 110 (source code). The develop stage 102 may generate or track code versions or the like. The code 110, at this stage 102 of the pipeline is not yet in an executable form. Depositing the code 110 into the repository 112 at the stage 102 may generate a trigger for the build stage 104.

The build stage 104 may retrieve or checkout the code 110 (or multiple components or code portions) from the repository 112 and then compile the code 110 into a form that can be executed. Compiling may depend on the programming language, the intended operating environment, or the like. The build stage 104 may also package the compiled code to generate an image or artifact 114. Unit testing may be performed in the build stage 104.

The test stage 106 may test the image 114 to determine that the image 114 operates as intended. The test stage 106 may perform a variety of tests. Once the tests on the image 114 (or portions thereof) are completed or successful, the deploy stage 108 is configured to deploy the image 114 to an operating environment. The operating environment may depend on how the image 114 is packaged. Thus, the specifics of the image 114 (or artifact or package) depends on the pipeline 100, the programming language, the intended operating environment, or the like.

The stages 102, 104, 106, and 108 may be broken down into other stages. For example, a pipeline may include a repository stage that relates to what happens when code is committed to a repository. A code stage may relate to what happens when code from the repository is accessed or checked out. A compile stage relates to compiling the code that has been checked out from the repository.

A unit test stage relates to performing unit tests on the code or the compiled code. Unit tests may, by way of example, test discrete functions of the source code. A unit test may execute a specific function for example.

A package stage relates to how the compiled code is packaged, which may depend on the programming language and the target environment. If the programming language is JAVA, a JAR file may be generated. If Docker containers are used, a docker image may be generated.

An acceptance test stage may test the package to ensure that the artifact, in whatever form, meets requirements. Finally, a deployment stage may result in an artifact that is ready for deployment and may deploy the artifact into production.

Figure 2A:
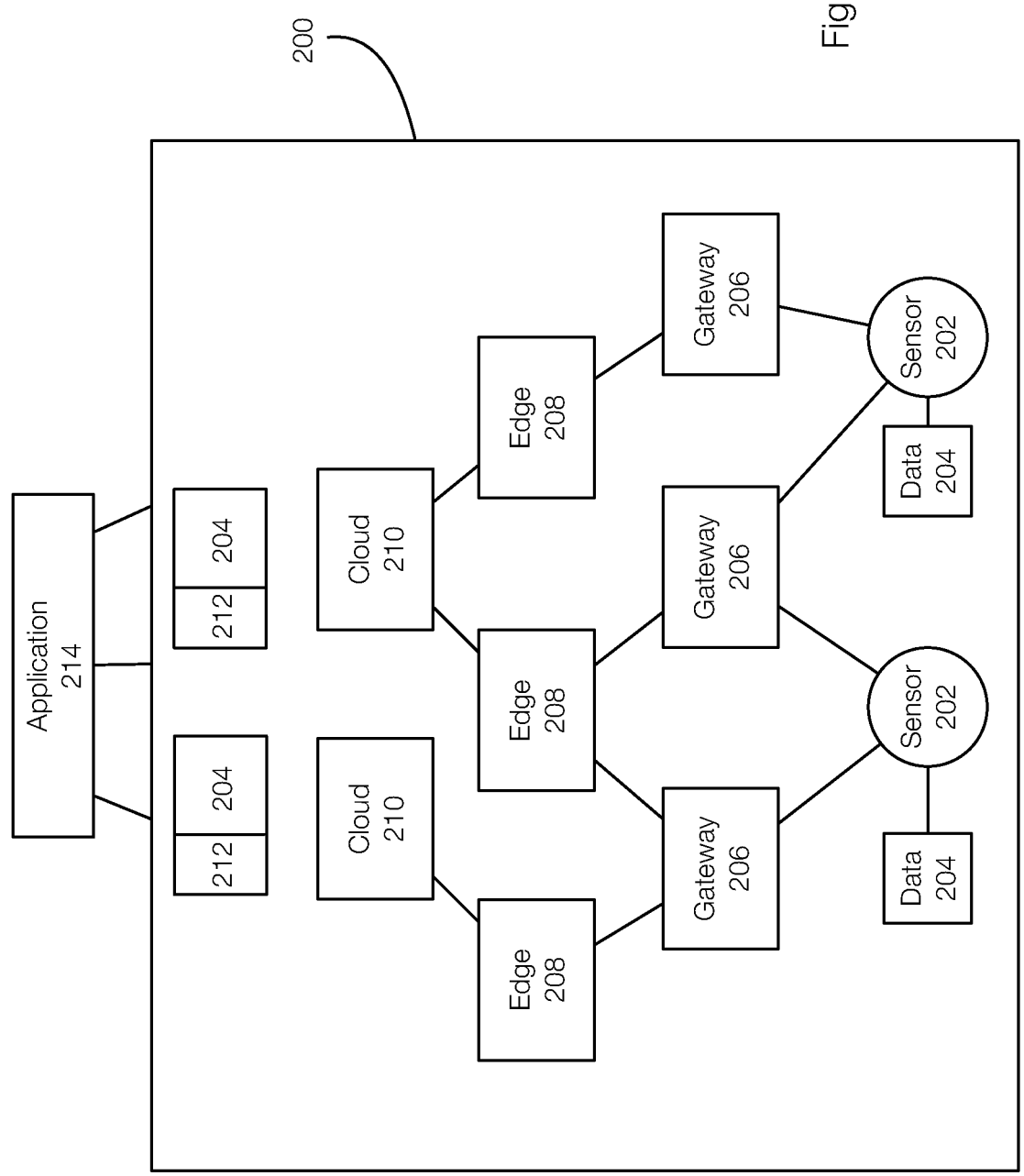
FIG. 2A discloses aspects of a data confidence fabric.

FIG. 2A discloses aspects of a data confidence fabric (DCF).

A data confidence fabric, by way of example only, may be an architecture and set of services that allow data to be ingested into a system for use by applications, infrastructure, services (IaaS) or the like. For example, the DCF adds, associates, or provides trust information (data confidence scores, annotations and other confidence information) to the data (e.g., code, compiled code, images, artifacts, operations, or identifiers thereof) as the data flows through the DCF or as code is passed through a pipeline. The data or code is associated with a trust or confidence score that provides a view into the trustworthiness of the data to an application or other use. Embodiments of the invention also relate to the hardware aspect of DCFs and the ability of hardware to contribute to confidence scores of the data being ingested or processed and provided to applications.

Confidence scores, which may include hardware based confidence scores and/or software confidence scores, f a DCF, allow an application to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

For example, an application that is intended to operate in a classified government environment may need to use applications that are very trustworthy (have a high confidence score) while an application to control lights in a home may not need to be as trustworthy (a lower confidence score is acceptable). In the context of a classified environment, the infrastructure may require that the hardware implementing the pipeline be firewalled from outside sources, provide hardware assisted encryption, deterministic routing, or the like or combination thereof.

Figure 2B:
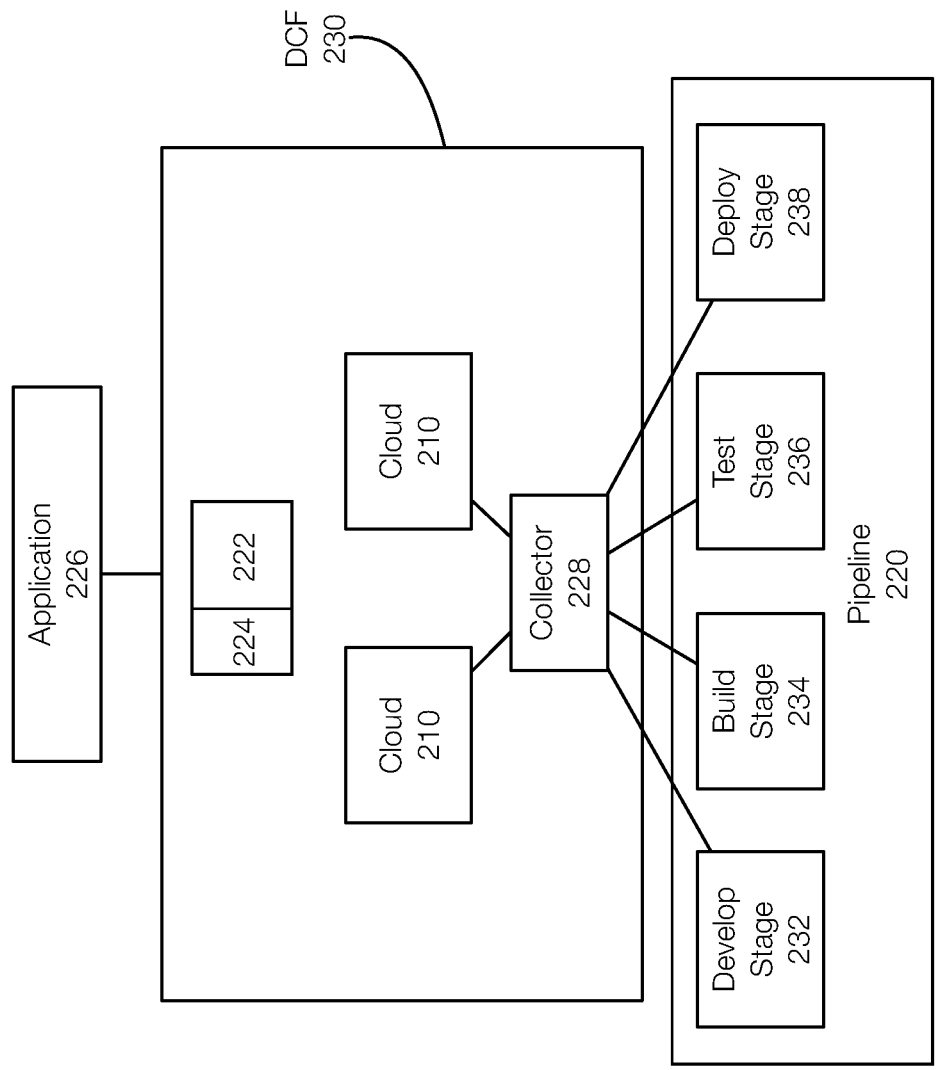
FIG. 2B discloses aspects of a data confidence fabric associated with or integrated with a pipeline.

FIG. 2A illustrates an example of a data confidence fabric (DCF 200). The DCF 200 includes various computing and hardware components, connections, and environments. The DCF 200 is configured to add confidence scores to data flowing in the DCF 200. The DCF 200 is also illustrated with respect to a pipeline 220 (FIG. 2B). The DCF 200 can interact with the pipeline 220 or be integrated with the pipeline 220 to generate data confidence scores.

FIG. 2A illustrates examples of data flows or paths in the DCF 200. A specific path of specific data may be referred to as a graph. As discussed in more detail herein, the graph of data can be retained and audited. In FIG. 2, data 204 generated by sensors 202 may flow through multiple levels or multiple hardware environments such as gateways 206, edges 208 and clouds 210. In one example, the data 204 or aspects thereof may be stored in the clouds 210.

As the data 204 flows through the DCF 200, the DCF 200 may add trust information (e.g., as annotations to the data) such as provenance and trust metadata or scoring to the data. After flowing through the DCF 200, the data 204 (which may have been generated by one of the devices 202) is stored in the cloud 210 and made available to an application 214 (or infrastructure or the like). The data 204 is associated with confidence information 212.

The confidence information 212 or annotations may include confidence scores, provenance data, audit trails, data graphs, applied trust insertion technologies, or the like. The confidence information 212 or portion thereof may be stored in a ledger, blockchain, or the like.

FIG. 2B discloses aspects of a data confidence fabric configured to operate with a pipeline. In the example of FIG. 2B, the DCF 230 is generally configured to add confidence information to, by way of example, data, code, operations or processes including pipeline related operations.

FIG. 2B illustrates a pipeline 220, which may include stages such as a develop stage 232, a build stage 234, a test stage 236, and a deploy stage 238. For example, during the build process in a pipeline in the build stage 234, the pipeline 220 will checkout code from a given source control repository. Subsequent to checkout and prior to build, if the pipeline 220 is compromised, a rogue script may inject new code into the source code before compilation. Prior to compilation, comparison of the locally checked out source code could be compared to the code stored in the upstream repository to make sure nothing has been tampered with. If tampering is detected, this may or may not stop the operation of the pipeline 220, but the difference is noted through DCF annotations or through data confidence scores. When the resulting image is published and a given infrastructure is instructed to execute the image via a manifest like Kubernetes Operator, that infrastructure would first check the confidence score for the image. If the confidence score does not meet the required threshold, the image will not be run, and the workload will fail. This allows infrastructure that executes an image to have a level of trust in the pipeline 220 that generated the image and, in the image, (or other executable) generated by the pipeline 220. A low confidence score can prevent the image from being executed and may prevent significant damage.

Embodiments of the invention allow confidence scores to be added from a hardware perspective and/or a software perspective. Embodiments of the invention relate to DCFs that allow pipelines, pipeline jobs, pipeline stages, pipeline operations, pipeline input, pipeline output, or the like to be associated with data confidence scores and/or other confidence information such as annotations.

As illustrated in FIG. 2B, the DCF 200 may also interact with the pipeline 220 or be integrated into the pipeline 220. This allows confidence scores to be generated and associated with data (such as code in various forms) flowing through the pipeline 220. In this example, the confidence information 224 is associated with pipeline data 222. The pipeline data 222 may represent the output of processes or operations, code, compiled code, artifacts, test results, unit test results, code comparisons, or the like or combination thereof. In one example, the data 222 may represent an artifact or image that is ready for deployment. The confidence information 224 may represent all of the annotations associated with the image as the image was generated. Thus, the data 222 may reflect the image as the image was transformed from source code to the image. The confidence information may also be related to all of the stages that operated on the data 222.

In one example, a collector 228 may be provided that is able to collect the confidence information when generated and transmit the confidence image to the cloud 210. Because the data 222 may represent code at multiple stages, the confidence information 224 may be collected at different times (e.g., when generated) and may be combined by the DCF 230.

Thus, the collector 228 may be sufficiently integrated with each of the stages 232, 234, 236, and 238 such that the confidence information can be collected as the pipeline operates. This allows annotations to be collected and included in the confidence information 224 whenever the data 222 (in whatever form or stage) is accessed, transformed, compiled, packaged, deployed, tested, or the like.

In one embodiment, the collector 228 may be integrated into the stages of the pipeline 220 such that, whenever a job occurs or whenever certain jobs occur or are performed, an annotation is generated. In effect, this is an example of trust insertion into data being processed by a pipeline.

Figure 3:
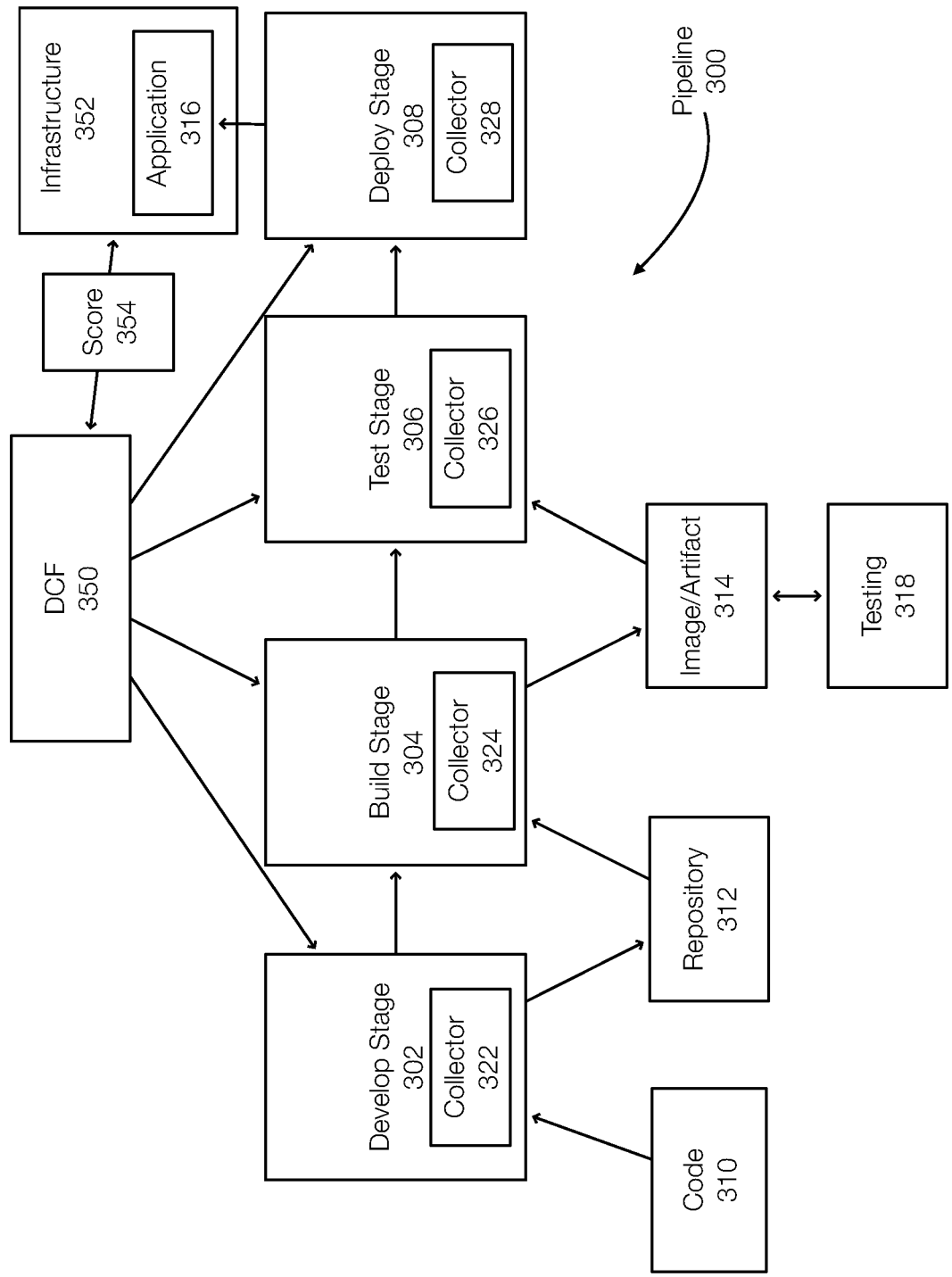
FIG. 3 discloses aspects of generating a confidence score for a build performed in a pipeline.

FIG. 3 discloses aspects of a relationship between a pipeline and a DCF.

FIG. 3 illustrates a pipeline 300, which is an example of the pipeline 100 and which includes a develop stage 302, a build stage 304, a test stage 306, and a deploy stage 308. In this example, the code 310 is handled by the develop stage 302, which may store the code 310 in the repository 312. The repository 312 is also associated with at least the build stage 304. The image/artifact 314 and testing 318 is associated with at least the build stage 304 and the test stage 306. The application 316, which operates in an infrastructure 352 is associated with the deploy stage 308.

In this example, each of the stages 302, 304, 306, and 308 is associated with, respectively, a collector 322, 324, 326, and 328. The collectors 322, 324, 326, and 328 are generally configured as a mechanism by which confidence annotations are generated and/or by which data used to generate confidence scores are generated.

For example, when the code 310 is deposited into the repository 312, there may be various hardware/software interactions that occur. Each of these interactions or actions may be associated with a score. For example, the score may represent whether the transmission of the code was secure, whether the network interface card can prevent non-authorized placement of data into memory, whether the repository 312 provides secure storage capabilities, whether secure enclaves for compute operations are provided, or the like.

For the insertion of the code 310 into the repository 312 in the develop stage 302, each transaction may generate confidence information that may be appended to or associated with the code 310.

Each action may result in confidence information. Thus, depositing the code 310 into the repository 312 may result in confidence information. The confidence information may reflect the action (storing the code 310 in the repository 312) and identify the trust insertion technologies that were applied or not applied. This information may be collected by the collector 322 and provided to the DCF 350. Stated alternatively, information about the associated software/hardware that generated the confidence information or handled the confidence information in any way may be part of the DCF 350.

Thus, the code 310 (or an identifier associated with the code or the code version) may be included in the confidence information generated or collected by the collector 322 and provided to the DCF 350. In one example, the DCF 350 or the pipeline 300 may be associated with multiple operations, hardware, software, (referred to as trust insertions) or the like and each may be associated with an entry in the confidence information provided to the DCF 350.

Embodiments of the invention may generate a confidence score for any artifact (e.g., application 316) that is deployed to an infrastructure 352. The infrastructure 352 can query the DCF 350 to obtain the confidence score associated with the application 316 prior to installation or execution. The score 354 of the application 316 may reflect or include scores associated with all of the operations in the pipeline 300 that generated a score. The score 354 may also include other confidence information generated by the DCF 350.

For example, the score 354 may include a confidence score generated by comparing code (just prior to compilation) checked out by the build stage with code stored in the repository 312. If the code matches, a high confidence score is generated. This helps ensure that rogue code is not injected into the code 310 after being checked out and prior to being compiled.

Confidence scores may be associated with each unit test and with the overall testing. Confidence scores can be associated with packaging operations or the like. The DCF 350 may combine all of the confidence scores for a given version of code that reflects the confidence in the pipeline 300 and in the application 316 generated by the pipeline 300. In one example, the score 354 is a cumulative score that is associated with the code 310 as the code is transformed into the application 316.

Examples of trust insertions may include an analysis of the raw source code, dependency auditing, checksum verification after compilation, signing of published images. The DCF 350 may be configured to capture visibility at points where malicious code could be inserted or where the pipeline is not configured to operate at a desired security threshold. This may occur at each stage of the pipeline 300.

Figure 4:
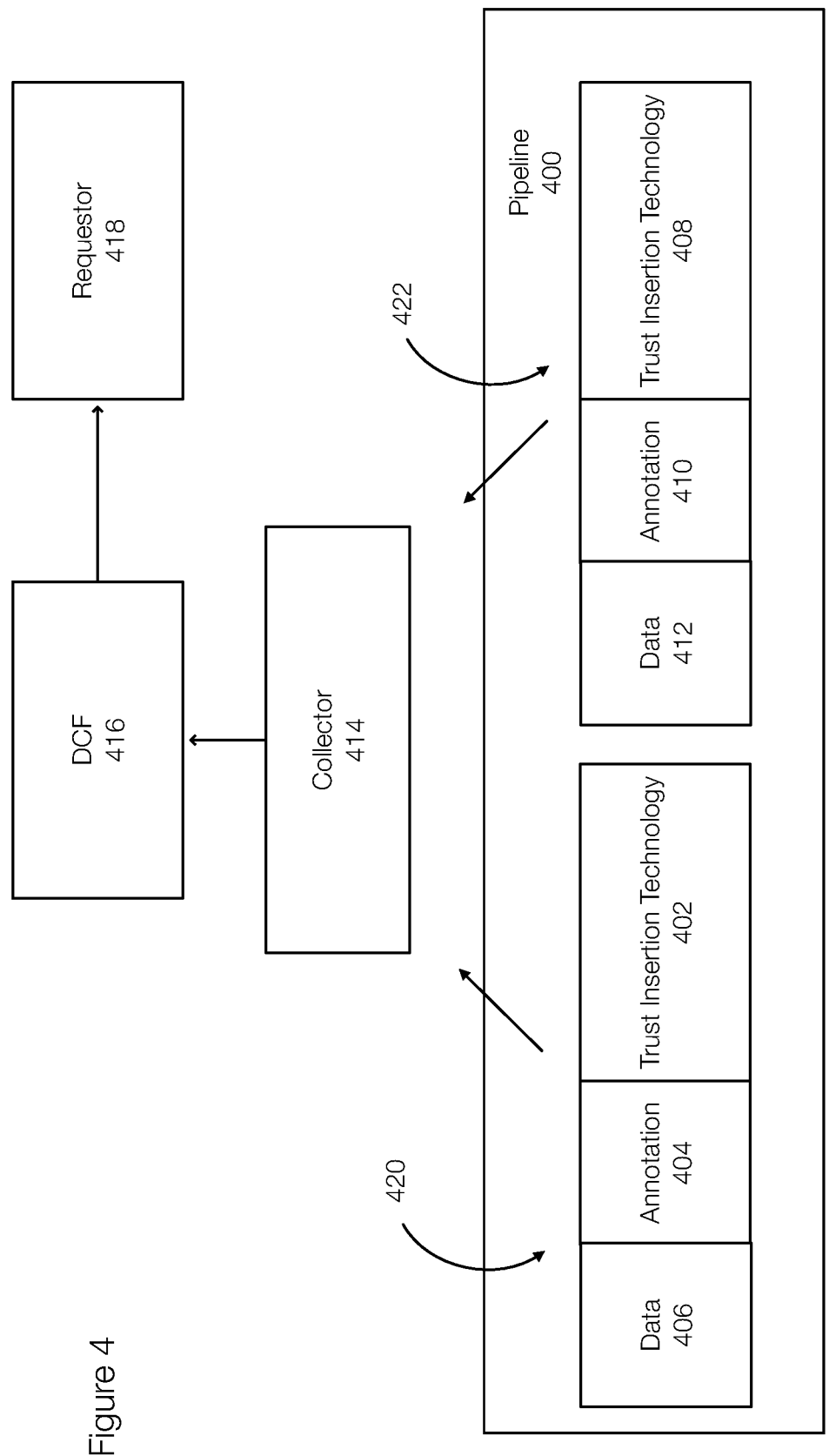
FIG. 4 discloses aspects of confidence information generated in a build pipeline.

FIG. 4 discloses aspects of one embodiment of a collector. FIG. 4 illustrates a pipeline 400, which is an example of the pipeline 100. In this example, the pipeline includes trust insertion technologies, represented by trust insertion technologies 402 and 408. The trust insertion technology 402 is associated with an annotation 404 and data 406. The trust insertion technology 408 is associated with an annotation 410 and a data 412.

The data 406 and the data 412 may refer to the same or different code. For example, the data 406 may refer to code A and the data 412 may refer to code B.

In another example, the data 406 may refer to code A and the data 412 may refer to compiled code A or an image A. In this example, the trust insertion technologies operated on the same data (even if in a different form) at different stages of the pipeline.

If the data 406 identifies or corresponds to code A and code A is submitted to a repository during the develop stage, a trust insertion technology, such as a raw code analysis, may analyze the code for security flaws. The result of the analysis may be reflected in the annotation 404. The annotation 404 may be a score (e.g., between 1 and 10), a yes or no, or other metric and may include a text or other description. The confidence information 420, which includes information related to the trust insertion technology, the annotation 404, and the data 406 (or pipeline identifier or the like) may be transmitted directly to the DCF 416 or collected by the collector 414. The collector 414 may accumulate scores for all relevant trust insertions in a given stage.

Later in the pipeline, a dependency auditing, which is an example of the trust insertion technology 408, may be performed and may result in the annotation 410 and data 412. If the confidence information 420 and 422 are for the same code, scores may be combined in a simple manner, a weighted manner, or the like.

Thus, during operation of the pipeline 400, there are many instances where confidence information is generated. Other trust insertion technologies include checksum verification after compilation, signing of published images, or the like. The confidence information 420 and 422 may be stored by the DCF 416 in a ledger or blockchain. The requestor 418 (e.g., a deployment environment) may request the score of an application prior to installation or deployment. A decision can be made regarding the application based on the confidence score. A low confidence score may trigger an audit, which can be performed using the confidence information. Embodiments of the invention thus allow a DCF to be active at the application layer (as illustrated in FIG. 2) and in the build pipeline.

In effect, the code stored in the database, and each operation performed in the pipeline allows the code to be annotated with confidence information, which may include a confidence score. The final confidence score of an application may be generated from all of the confidence scores or confidence information associated with the various operations performed in the build pipeline.

Figure 5:
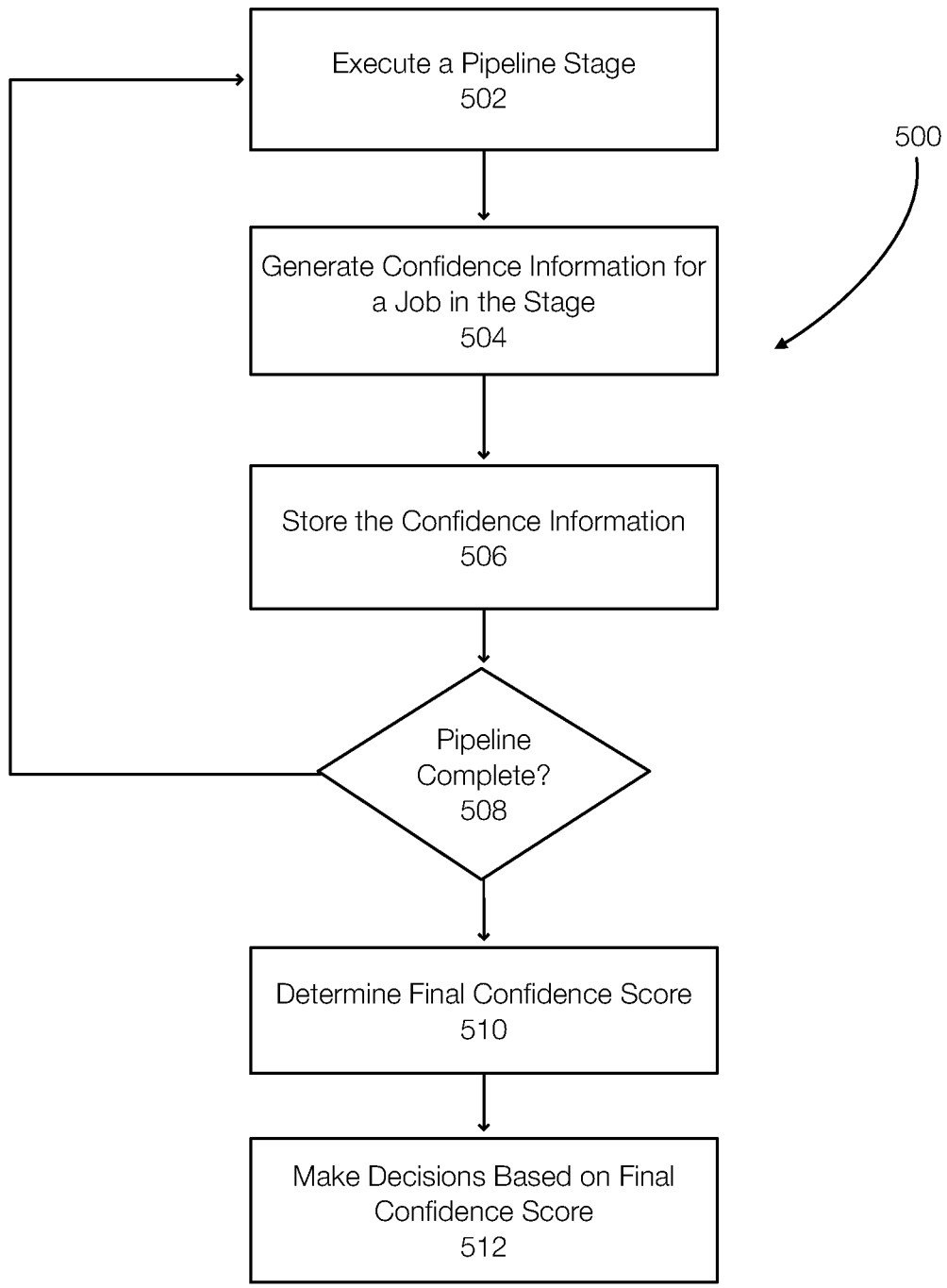
FIG. 5 discloses aspects of generating confidence scores for a build pipeline.

FIG. 5 discloses aspects of a method for applying a DCF to a pipeline. In FIG. 5, a method 500 may begin by executing 502 a pipeline stage. This may be triggered when code is received from a developer. Jobs are performed on the code in the stage and confidence information is generated 504 for each job, when possible, in the stage.

The confidence information may include, by way of example, one or more of the code (or a representation or identifier of the code), a trust insertion component, annotations, a score. For example, if the code was subjected to a security analysis, the confidence information may identify the code, identify the specifics of the security analysis, and results of the analysis (e.g., pass/fail or a score). The confidence score may be a 1 to indicate that the trust insertion (the security analysis) was performed or successful or a 0 indicating that the analysis was not performed or failed. When the final confidence score is determined, the DCF may aggregate all of the scores from each of the jobs to generate a final score. In another example, confidence information for a job such as storing the code to a code repository is generated. The confidence information may indicate that the storage has secure storage. Another trust insertion may indicate that the code deposited into the repository was signed by an appropriate entity. These may each contribute in a positive, neutral, or negative manner to the final confidence score.

The confidence information is then stored 506. The manner in which the confidence information is handled after being generated may also contribute to the final confidence score. If the pipeline is complete (Y at 508), a final confidence score is generated 510 and stored in a storage such as a ledger or blockchain. If the pipeline is not complete (N at 508), the next stage of the pipeline is executed, and similar confidence scores are generated.

Once the final score is determined 510, the final score is typically associated with the output of the build pipeline and reflects the jobs performed in the pipeline from retrieving the code to generating the final output (e.g., an image). Decisions can be made 512 using the final confidence score and/or other confidence information associated with the final output of the pipeline. The decision may include to install the image, not install the image, conduct an audit, or the like.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, pipeline operations which may include, but are not limited to, code deposit operations, compile operations, code packaging operations, deployment operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, or containers, or any combination of these, though no particular device implementation or configuration is required for any embodiment.

As used herein, the term 'data' is intended to be broad in scope. Thus, that term embraces, by way of example and not limitation, source code, compiled code, pipeline artifacts, images, executable, binaries, packaging, or the like.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: for each stage of a pipeline that includes stages: executing a stage of a pipeline for a code portion, generating confidence information for a job performed on the code portion in the stage, and storing the confidence information in a data confidence fabric, and generating a final confidence score for an artifact generated by the pipeline from the code portion, wherein the final confidence score includes confidence scores for the code portion for all of the stages.

Embodiment 2. The method of embodiment 1, wherein the stage is a develop stage and the job includes one or more of receiving the code portion from a developer and storing the code portion in a repository, wherein generating confidence information includes generating confidence information for performing a security analysis on the code portion and generating confidence information related to storing the code portion in the repository.

Embodiment 3. The method of embodiment 1 and/or 2, wherein the stage is a build stage, and the job includes one or more of retrieving the code portion from the repository, comparing the retrieved code portion to the code portion in the repository prior to compilation, and compiling the code portion, further comprising generating confidence information for retrieving the code portion, for comparing the code portion, and for compiling the code portion.

Embodiment 4. The method of embodiment 1, 2, and/or 3, wherein the stage is a test stage, and the job includes one or more of performing unit tests or testing the compiled code portion, further comprising generating confidence information for performing the unit tests and for testing the compiled code portion.

Embodiment 5. The method of embodiment 1, 2, 3, and/or 4, wherein the stage is a deploy stage and the job includes one or more of generating an artifact, signing the artifact, and publishing the artifact, further comprising generating confidence information for generating the artifact, generating confidence information for signing the artifact, and generating confidence information for publishing the artifact.

Embodiment 6. The method of embodiment 1, 2, 3, 4, and/or 5, wherein the final confidence score includes confidence scores for multiple jobs performed on the code portion at multiple stages.

Embodiment 7. The method of embodiment 1, 2, 3, 4, 5, and/or 6, wherein the final confidence score is associated with annotations that describe trust insertions performed on the code portion.

Embodiment 8. The method of embodiment 1, 2, 3, 4, 5, 6, and/or 7, further comprising determining whether to execute the artifact in an infrastructure based on the final confidence score and/or the annotations.

Embodiment 9. The method of embodiment 1, 2, 3, 4, 5, 6, 7, and/or 8, further comprising performing an audit of the pipeline.

Embodiment 10. The method of embodiment 1, 2, 3, 4, 5, 6, 7, 8, and/or 9, wherein the artifact is at least one of an application, an image, an executable, a binary, or is packaged based on a programming language and/or an execution environment.

Embodiment 11. A method for performing any of the operations, methods, or processes, or any portion of any of these, or any combination of these, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
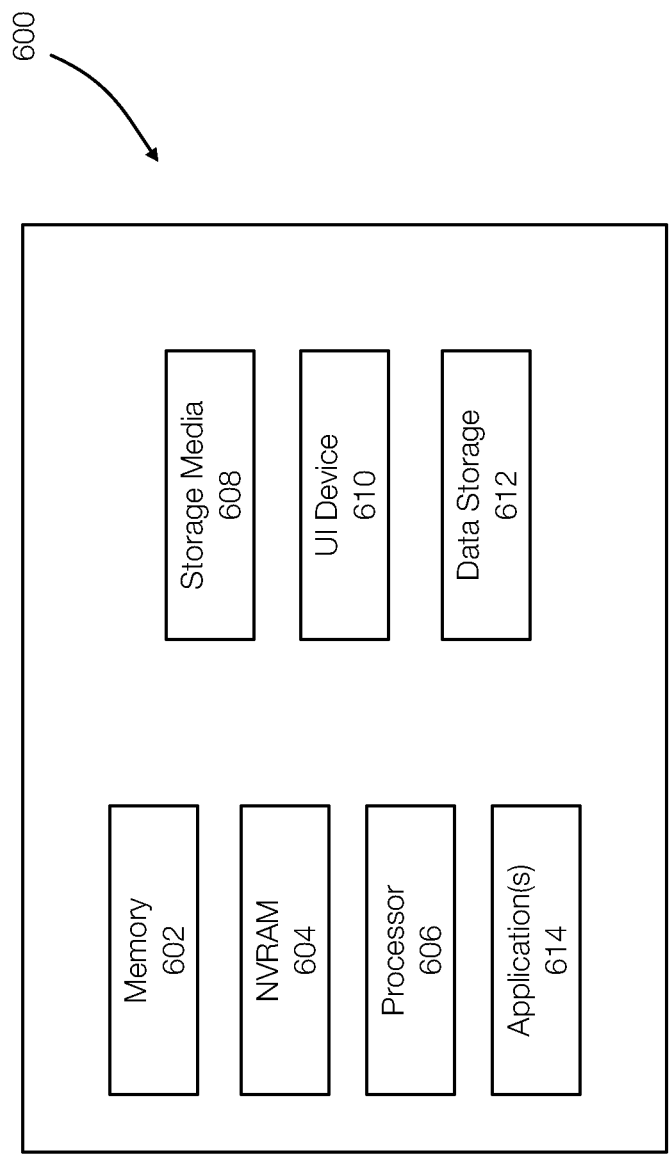
FIG. 6 discloses aspects of a computing device or a computing environment.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
for each stage of a pipeline that includes two or more of a development stage, a build stage, a test stage, and a deploy stage:
 executing the stage of the pipeline for a code portion;
 for each job performed on the code portion in the stage, generating job-specific confidence information, wherein the confidence information includes a plurality of annotations produced using two or more heterogeneous trust insertion technologies selected from static code analysis, dependency auditing, cryptographic signing, and runtime environment verification
 cryptographically linking each instance of the confidence information to a unique identifier for the job and the code portion; and
 storing the confidence information and corresponding metadata in an immutable blockchain-based ledger maintained by a data confidence fabric, wherein the data confidence fabric is integrated with each of the pipeline stages and configured to collect, timestamp, and store the confidence information in real time; and
generating a final confidence score for an artifact generated by the pipeline from the code portion, wherein:
 the final confidence score includes job-specific confidence scores for each of the jobs performed on the code portion across the stages, and
 the final confidence score is computed using a weighted function over the job-specific confidence scores and a validity check of the corresponding cryptographically linked provenance records.

2. The method of claim 1, wherein, for the development stage, the job includes one or more of receiving the code portion from a developer and storing the code portion in a repository, wherein generating job-specific confidence information includes generating confidence information for performing a security analysis on the code portion and generating confidence information related to storing the code portion in the repository.

3. The method of claim 1, wherein, for the build stage, the job includes one or more of retrieving the code portion from the repository, comparing the retrieved code portion to the code portion in the repository prior to compilation, and compiling the code portion, further comprising generating job-specific confidence information for retrieving the code portion, for comparing the code portion, and for compiling the code portion.

4. The method of claim 1, wherein, for the test stage, the job includes one or more of performing unit tests or testing the compiled code portion, further comprising generating job-specific confidence information for performing the unit tests and for testing the compiled code portion.

5. The method of claim 1, wherein, for the deploy stage, the job includes one or more of generating an artifact, signing the artifact, and publishing the artifact, further comprising generating job-specific confidence information for generating the artifact, generating confidence information for signing the artifact, and generating confidence information for publishing the artifact.

6. The method of claim 1, wherein the final confidence score includes job-specific confidence scores for multiple jobs performed on the code portion at multiple stages.

7. The method of claim 1, wherein the final confidence score is associated with annotations that describe trust insertions performed on the code portion.

8. The method of claim 7, further comprising determining whether to execute the artifact in an infrastructure based on the final confidence score and/or the annotations.

9. The method of claim 8, further comprising performing an audit of the pipeline.

10. The method of claim 8, wherein the artifact is at least one of an application, an image, an executable, a binary, or is packaged based on a programming language and/or an execution environment.

11. A non-transitory storage medium having stored therein instructions that are executable by one or more hardware processors to perform operations comprising:
for each stage of a pipeline that includes two or more of a development stage, a build stage, a test stage, and a deploy stage:
executing the stage of the pipeline for a code portion;
for each job performed on the code portion in the stage, generating job-specific confidence information, wherein the confidence information includes a plurality of annotations produced using two or more heterogeneous trust insertion technologies selected from static code analysis, dependency auditing, cryptographic signing, and runtime environment verification;
cryptographically linking each instance of the confidence information to a unique identifier for the job and the code portion; and
storing the confidence information and corresponding metadata in an immutable blockchain-based ledger maintained by a data confidence fabric wherein the data confidence fabric is integrated with each of the pipeline stages and configured to collect, timestamp, and store the confidence information in real time;
generating a final confidence score for an artifact generated by the pipeline from the code portion, wherein:
the final confidence score includes job-specific confidence scores for each of the jobs performed on the code portion across the stages, and
the final confidence score is computed using a weighted function over the job-specific confidence scores and a validity check of the corresponding cryptographically linked provenance records.

12. The non-transitory storage medium of claim 11, wherein, for the development stage, the job includes one or more of receiving the code portion from a developer and storing the code portion in a repository, wherein generating job-specific confidence information includes generating confidence information for performing a security analysis on the code portion and generating confidence information related to storing the code portion in the repository.

13. The non-transitory storage medium of claim 11, wherein, for the build stage, the job includes one or more of retrieving the code portion from the repository, comparing the retrieved code portion to the code portion in the repository prior to compilation, and compiling the code portion, further comprising generating job-specific confidence information for retrieving the code portion, for comparing the code portion, and for compiling the code portion.

14. The non-transitory storage medium of claim 11, wherein, for the test stage, the job includes one or more of performing unit tests or testing the compiled code portion, further comprising generating job-specific confidence information for performing the unit tests and for testing the compiled code portion.

15. The non-transitory storage medium of claim 11, wherein, for the deploy stage, the job includes one or more of generating an artifact, signing the artifact, and publishing the artifact, further comprising generating job-specific confidence information for generating the artifact, generating confidence information for signing the artifact, and generating confidence information for publishing the artifact.

16. The non-transitory storage medium of claim 11, wherein the final confidence score includes job-specific confidence scores for multiple jobs performed on the code portion at multiple stages.

17. The non-transitory storage medium of claim 11, wherein the final confidence score is associated with annotations that describe trust insertions performed on the code portion.

18. The non-transitory storage medium of claim 17, further comprising determining whether to execute the artifact in an infrastructure based on the final confidence score and/or the annotations.

19. The non-transitory storage medium of claim 18, further comprising performing an audit of the pipeline.

20. The non-transitory storage medium of claim 18, wherein the artifact is at least one of an application, an image, an executable, a binary, or is packaged based on a programming language and/or an execution environment.

* * * * *